(12) United States Patent
Wilkinson et al.

(10) Patent No.: US 11,119,841 B2
(45) Date of Patent: *Sep. 14, 2021

(54) CHECKING DATA INTEGRITY OF DATA STORAGE SYSTEMS

(71) Applicant: INTERNATIONAL BUSINESS MACHINES CORPORATION, Armonk, NY (US)

(72) Inventors: John Wilkinson, Salisbury (GB); Andrea Sipka, Nursery Gardens (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/660,684

(22) Filed: Oct. 22, 2019

(65) Prior Publication Data

US 2020/0050508 A1 Feb. 13, 2020

Related U.S. Application Data

(63) Continuation of application No. 15/837,098, filed on Dec. 11, 2017, now Pat. No. 10,528,416.

(51) Int. Cl.
*G06F 11/00* (2006.01)
*G06F 11/07* (2006.01)
*G06F 11/22* (2006.01)

(52) U.S. Cl.
CPC ........ *G06F 11/079* (2013.01); *G06F 11/0727* (2013.01); *G06F 11/0751* (2013.01); *G06F 11/2221* (2013.01)

(58) Field of Classification Search
CPC .............. G06F 11/0727; G06F 11/079; G06F 11/0751; G06F 11/08; G06F 11/10;
(Continued)

(56) References Cited

U.S. PATENT DOCUMENTS 8,413,029 B2  4/2013 Rauschmayer et al.
8,818,962 B2  8/2014 Mandagere et al.
(Continued)

OTHER PUBLICATIONS

"High Performance Solid State Storage," http://www.soliddata.com/products/i_otest.html, retrieved on Dec. 15, 2016 (1 page).
(Continued)

*Primary Examiner* — Michael Maskulinski
(74) *Attorney, Agent, or Firm* — Griffiths & Seaton PLLC

(57) ABSTRACT

A method and apparatus for validating operation of a data volume on a storage medium. A data integrity component is provided which writes data blocks to the volume in a sequence, each data block storing a sequence number and also write status information specifying the sequence numbers of those preceding data blocks in the stream which are still being written to the volume at the time the data block is generated. Data validation is performed by reading back the stored data blocks from the volume and checking that the sequence numbers stored in them match those that should be present based on the sequence numbers stored in the write status information of the last-written data block found on the volume.

20 Claims, 5 Drawing Sheets

(58) Field of Classification Search
CPC ............. G06F 11/1004; G06F 11/1008; G06F 11/1407; G06F 11/1446; G06F 11/1471; G06F 11/1474; G06F 16/2365; G06F 16/2379
See application file for complete search history.

(56) References Cited

U.S. PATENT DOCUMENTS

| | | | |
|---|---|---|---|
| 9,021,321 B2 | 4/2015 | Finch et al. | |
| 10,528,416 B2* | 1/2020 | Wilkinson | G06F 11/0751 |
| 2005/0060603 A1* | 3/2005 | Pomaranski | G11C 29/52 |
| | | | 714/6.32 |
| 2005/0286298 A1* | 12/2005 | Hyvonen | G06F 11/0727 |
| | | | 365/185.04 |
| 2009/0067081 A1* | 3/2009 | Sato | G06F 11/0727 |
| | | | 360/71 |
| 2016/0196178 A1 | 7/2016 | Francis et al. | |
| 2016/0307643 A1 | 10/2016 | Wu et al. | |
| 2017/0308303 A1* | 10/2017 | Sterns | G06F 3/067 |
| 2018/0314725 A1* | 11/2018 | Subramanian | G06F 11/1004 |

OTHER PUBLICATIONS

List of IBM Patents or Patent Applications Treated as Related (2 Pages).

* cited by examiner

CHECKING DATA INTEGRITY OF DATA STORAGE SYSTEMS

CROSS REFERENCE TO RELATED APPLICATIONS

This Application is a Continuation of U.S. patent application Ser. No. 15/837,098, filed on Dec. 11, 2017.

BACKGROUND OF THE INVENTION

Field of the Invention

The present invention relates in general to computers, and more particularly to checking the integrity of a data storage system and corresponding apparatus in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. As great strides and advances in technologies come to fruition, the greater the need to make progress in these systems advantageous for efficiency in data transfer, retrieval, and storage.

SUMMARY OF THE DESCRIBED EMBODIMENTS

Various embodiments for validating operation of a storage medium that is subdivided into a number of address blocks available for data storage are presented. In one embodiment, by way of example only, a method for validating operation of a storage medium, again by a processor, is provided. For accessing data integrity of the storage medium, a stream of data blocks in sequence to the storage medium, each data block being allocated a sequence number indicating its position in the stream, the sequence number being stored with the data block together with write status information specifying the sequence numbers of those preceding data blocks in the stream.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
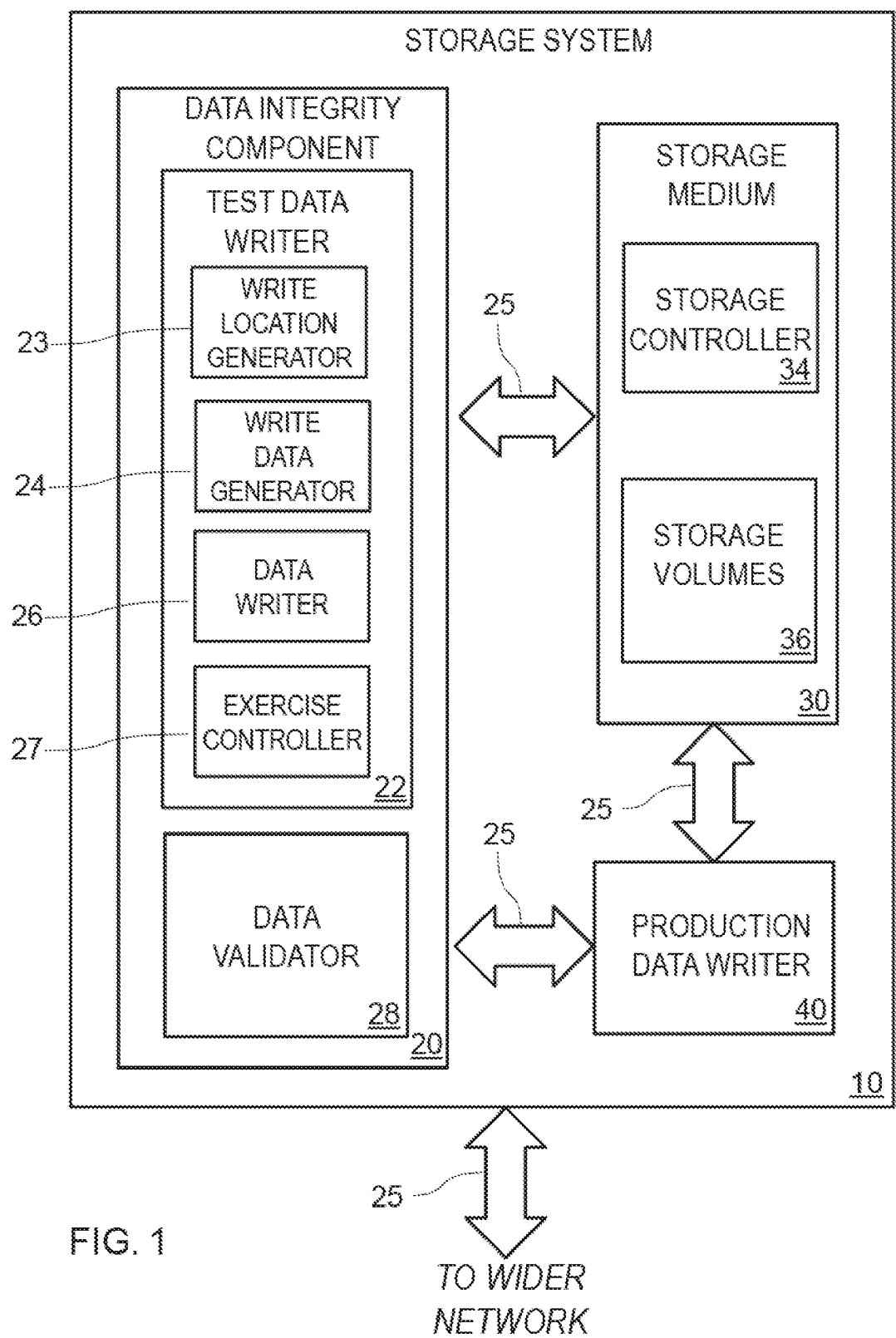
FIG. 1 is a block diagram depicting an exemplary storage system comprising a data integrity component in which aspects of the present invention may be realized.

Since data stored on data storage systems may become errored, it is necessary to provide utility procedures and associated hardware, firmware and software, to check the integrity of the stored data. Procedures which perform test actions on a storage system before it is put in production use are sometimes called exercisers, in particular disk exercisers, since they put the volumes of a storage system through their paces to test whether they are operating reliably—typically by writing test data to the storage volumes and then reading the data back again to check that the read-back data is identical to the test data that was written.

US 2016/0196178 A1, incorporated herein, discloses an example disk exerciser.

When testing storage systems and related devices such as storage controllers, it is useful to generate test patterns of data writes. When the data is read back later, the read-back data can be checked for conformity to the test pattern, thereby to check whether the data was correctly stored, or correctly manipulated, by the system under test. One important concept to test is that the data in a storage volume remains consistent at all times. In real-world usage, this is equivalent to preserving the order of transactions in a database. To test this, one could write a sequence of data to a volume, then re-read the data and verify that the data recalled does not omit any writes depended on by writes that are present. For a replicating storage system, the data may be read for verification from the disaster recovery (synonym: secondary or back-up copy) of the data. A copy of the state of a storage device at a particular point in time is referred to as a point-in-time (PiT) copy. Within IBM® "Z/OS", this can be made with the FlashCopy function.

It is difficult to design an exerciser that is able to test a volume at an arbitrary point in time. For example, with replicated data, if the system is preserving data consistency, it would be necessary to stop the replication process while writing the sequence of data, and analyze the disaster recovery copy in isolation to check that it is consistent. Encapsulating which writes depend on which other writes in a form that can be identified on the permanently-moving state of a volume is non-trivial, so this problem is normally solved by stopping writing to the production or primary copy of the data and then waiting for all outstanding changes to be replicated before testing. This ensures that there are no writes that have been submitted, but not yet completed, before testing the volume by comparing its primary and secondary copies. Any differences between these copies show that some data was missed and the volume is errored.

However, this approach is based on static views, and means that some error cases will be missed. In particular, an unwanted consequence of letting all writes complete on both copies before making the test comparison is that some data inconsistencies may be fixed and thus not seen in a static view, whereas a real-world disaster would have left the inconsistent data on the volume. That is, the existing approaches based on static views do not identify all cases in which the PiT copy or continuous replication solution are errored with inconsistent data.

Nevertheless, it is desirable that comparisons are not performed during the test data write, as the re-reads will slow down throughput, which may result in issues not being visible, and the additional commands submitted to the storage system may alter its behavior.

U.S. Pat. No. 8,818,962 B2, incorporated herein, discloses a method for testing PiT copies of data from a storage device for mutual data consistency. However, the disclosed method is limited in its capability, for example by using the well-known file system consistency check (fsck), which is available in Unix and Unix-like operating systems, to test whether a file system is corrupt. There are many types of data inconsistencies that would not be detected through this method, for example multiple interdependent changes to an existing file. This method also has the limitation of requiring that any file system type to which the method is applied has to be predefined.

In the present disclosure, the present invention proposes a method of testing a volume, and corresponding apparatus, which are able to write data to a volume in a way that is possible to statically analyze at any arbitrary point in time that all completed writes are present. The method can be applied by taking a point-in-time (PiT) copy of the volume at any arbitrary point in time, or by freezing the storage system at any arbitrary point in time and checking the volume directly.

According to one aspect of the disclosure, there is provided a method for validating operation of a storage medium that is subdivided into a number of address blocks available for data storage, the method comprising: providing such a storage medium; providing a data integrity component comprising: a write data generator for generating a stream of data blocks in sequence to write to the storage medium, each data block being allocated a sequence number indicating its position in the stream, the sequence number being stored with the data block together with write status information specifying the sequence numbers of those preceding data blocks in the stream which are still being written to the storage medium at the time the data block is generated; a write location generator for allocating the address block to which the next data block in the stream shall be written by applying a sequencing function to the sequence number; a data writer for performing a write process for each data block to its allocated address block; an exercise controller operable to control the write data generator, the write location generator and the data writer to exercise the storage medium by generating a stream of data blocks, and to perform a write process to the allocated address block for each data block; and a data validator for assessing data integrity on the storage medium at any arbitrary point in time during operation of the exercise controller; exercising the storage medium with the exercise controller; using the data validator to assess data integrity, at any arbitrary point in time during the exercising, to assess data integrity on the storage medium by: examining the storage medium to identify from the data blocks stored on the storage medium their sequence numbers; among the identified data blocks identifying the last-written data block which is the one with the highest sequence number; extracting from the last-written data block its write status information; and determining from the set of sequence numbers and write status information that the identified data blocks are a match with those specified in the write status information; failing the test conditional on the checking failing to establish the match.

According to another aspect of the disclosure, there is provided a data integrity component for validating operation of a storage medium that is subdivided into a number of address blocks available for data storage, the data integrity component comprising: a write data generator for generating a stream of data blocks in sequence to write to the storage medium, each data block being allocated a sequence number indicating its position in the stream, the sequence number being stored with the data block together with write status information specifying the sequence numbers of those preceding data blocks in the stream which are still being written to the storage medium at the time the data block is generated; a write location generator for allocating the address block to which the next data block in the stream shall be written by applying a sequencing function to the sequence number; and a data writer for performing a write process for each data block to its allocated address block; an exercise controller operable to exercise the storage medium by generating a stream of data blocks, and to perform a write process to the allocated address block for each data block; a data validator for assessing data integrity on the storage medium, at any arbitrary point in time during exercise by the exercise controller, to assess data integrity on the storage medium by: examining the storage medium to identify from the data blocks stored on the storage medium their sequence numbers; among the identified data blocks identifying the last-written data block which is the one with the highest sequence number; extracting from the last-written data block its write status information; determining from the set of sequence numbers and write status information that the identified data blocks are a match with those specified in the write status information; and failing the test conditional on the checking failing to establish the match.

The proposed method and data integrity component can drive a sequence of I/O in a manner that the data on a volume can be inspected for self-consistency without having to store complex interactions between I/Os. The method and data integrity component is able to identify the presence of lost individual writes, and of writes that have been applied out of order.

The proposed method and data integrity component can be implemented either such that a sequence of test writes is applied once to the volume, or such that test writes are run continually to allow the state of the volume to be understood at any point.

The proposed method and data integrity component is not restricted to use for testing, but can also be used in a production environment. For production use, the test method is modified by including the test data as metadata in the writes of production (i.e., customer) data. The additional metadata allows for a PiT copy or a frozen volume to be validated independently of any self-consistency check of the customer data, albeit in a more limited way than in a test environment, where the whole process can be dedicated to optimizing the validation.

The proposed method and data integrity component is applicable to a single volume or to a set of volumes. In the following, the present invention may refer generally to a volume in the singular, but it will be understood that throughout such references could be to a set of volumes which have a contiguous address space.

The proposed method and data integrity component allows for checking of data integrity while the I/O is running (i.e., while writes are in progress) and therefore addresses the limitation of prior art methods which require the I/O to be quiescent (i.e., not being in the middle of a write) at the time of taking the PiT copy, or at the time the storage system is frozen.

Examples of PiT copies are a FlashCopy in IBM Spectrum Virtualize or IBM z/OS and Global Mirror in IBM z/OS checking.

In the following paragraphs, reference to 'the method' should be interpreted to include corresponding features of the data integrity component just specified above.

In some embodiments, the match is determined by checking that the sequence numbers of the identified data blocks correspond to those that should be present on the storage medium based on the sequence numbers stored in the write status information of the last-written data block.

The method may be extended so as to check that the sequence number extracted from each data block, when applied to the sequencing function, results in an address block that matches the address block where that data block is actually located.

In some embodiments, the write status information comprises a write status bitmap having a bit for each sequence number between the current sequence number and the lowest sequence number among the write processes that are not yet complete, wherein each bit of the write status bitmap is set or unset depending on whether the write process for that sequence number is complete or not. The data integrity can then be tested by constructing a validation bitmap having bits corresponding to the bits of the write status bitmap, wherein each bit of the validation bitmap is set or unset depending on whether a data block with that sequence number is found during the examining, and then checking by making a bit-by-bit comparison of the write status bitmap and the validation bitmap. The checking may be further extended to check that data blocks are found in the examining of the storage medium for sequence numbers below the lowest sequence number among the write processes that are not yet complete stored in the write status information, at least within a range. This range is defined in some embodiments with reference to the periodicity of the sequencing function, specifically in test use where overwrites are controlled. In other embodiments, suitable for production use where overwrites may occur randomly, it is advisable to limit the range so that it does not extend to sequence numbers lower than that of the data block having the highest sequence number among the data blocks which were overwritten at the time the last-written data block was written.

The sequencing function can have various forms. A desirable property of the sequencing function is that it is periodic. This makes it possible to guarantee that all available blocks can be written to once when writes over one whole period are performed. In particular, the sequencing function may have a functional form which ensures that any overwrite of an address block within the data stream which replaces a previous data block with a new data block is deducible. In specific example implementations, the sequencing function has a periodicity of at least one of: 50, 60, 70, 80, 90, 100, 110, 120, 130, 140, 150, 160, 170, 180, 190 or 200% of the number of available address blocks in the storage medium. If the periodicity is 100% or more it can be ensured that all available blocks can be written to in one period. If the sequencing function has a periodicity greater than the number of available address blocks, i.e. >100%, then the write location generator is preferably configured to discard any address blocks that it computes that do not correspond to an available address block of the storage medium.

One specific useful form of the sequencing function is when it is sequential, allocating address blocks in incremental sequence, e.g.: 1, 2, 3, etc. This functional form can be implemented with a sequential write generator. Another specific useful form of the sequencing function is when it is pseudo-random, allocating address blocks across the address blocks available for normal read/write use in a pseudo-random (but not random) manner. This functional form can be implemented with a linear-feedback shift register (LFSR).

The arbitrary point in time when the data integrity of the storage medium is assessed may be such that: no writes, only one write; or multiple writes of the stream of writes is in progress.

In certain embodiments, the data writer is configured to operate with a maximum permitted number of write processes which are allowed to co-exist. This maximum permitted number may be user-configurable so it can be varied as desired, e.g., set to 1 to check serial operation, or set to a very large number, e.g., one to two thousand, to check massively parallel write operation. The writing process may be controlled with reference to the maximum permitted number of simultaneously outstanding writes, so that, if the number of write processes which are currently being written to the storage medium reaches the maximum permitted number, then performing of the next write process is stalled until the number has reduced to below the maximum permitted number.

Example values of the maximum permitted number which may be set are: 1, 2, 3, 4, 5, 6, 7, 8, 9, 10, a number between 11 and 100, a number between 101 and 200, a number between 201 and 300, a number between 301 and 400, a number between 401 and 500, a number between 501 and 600, a number between 601 and 1000, a number between 1001 and 1500, a number greater than 1501.

In each execution of the method, each data block may additionally contain an identifier for that method execution, so that data blocks written during the current execution of the method can be identified when performing the test on the storage medium.

The data integrity assessment may take place on a point-in-time copy or the live system. Namely, in some embodiments, a point-in-time copy of the storage medium is acquired, and the data integrity of the storage medium is assessed with reference to the point-in-time copy, whereas in other embodiments, the data integrity of the storage medium is assessed directly with reference to the storage medium, and during the assessment any incomplete write processes relating to data blocks which are still being written to the storage medium are paused, i.e., operation is frozen.

The method may be performed to execute the sequential function for one period, so that each address block is written to once. The method may alternatively be performed to execute the sequential function continuously over multiple periods, so that each address block is written to multiple times, wherein the method can be halted whenever desired by a halt command.

There are in principle two modes of operation, or operating environments, in which the method can be applied, in a test environment, and in a production environment. When the method is performed purely as a test, the data blocks may wholly consist of test data. On the other hand, when the method is performed in production use, the data blocks will comprise predominantly customer data, but also a portion of metadata containing the data block's sequence number and write status information so as to allow testing to take place on the live system. An issue with a live production environment is that the storage controller may at any time write to any available address block, so the overwriting of data cannot be controlled in the same way as in a test environment. In production use, the method is therefore modified to avoid inclusion of any data blocks which are encoded in the write status information when those blocks have in the meantime been overwritten on the storage medium. That is, when determining the match, the method omits any data blocks which have been overwritten.

According to another aspect of the disclosure, there is provided a computer program stored on a computer readable medium and loadable into the internal memory of a computer, comprising software code portions, when said program is run on a computer, for performing the above-described method. A computer program product storing the computer program may also be provided.

According to a further aspect of the disclosure, there is provided a method for validating operation of a storage medium that is subdivided into a number of address blocks available for data storage, the method comprising: providing such a storage medium; providing a data integrity component comprising: a write data generator for generating in sequence a sequence number for each data block as it is generated, the sequence number indicating the data block's position in a stream of data blocks and write status information specifying the sequence number of the oldest preceding write that has not yet completed and the highest sequence number among overwritten writes at the time the data block is generated; a data writer for inserting the sequence number and the write status information into a metadata portion of each data block as part of the write process; and a data validator for assessing data integrity on the storage medium at any arbitrary point in time; providing a data writer for writing customer data to the storage medium in which data blocks are written by write processes, the data blocks comprising a customer data portion and a metadata portion which is populated with the data block's sequence number and write status information; using the data writer to write data blocks to the storage medium; using the data validator to assess data integrity, at any arbitrary point in time, to assess data integrity on the storage medium by: examining the storage medium to identify from the data blocks stored on the storage medium their sequence numbers; among the identified data blocks identifying the last-written data block which is the one with the highest sequence number; extracting from the last-written data block its write status information; checking in a range of data blocks defined with reference to the write status information values for the sequence number of the oldest preceding write that has not yet completed and the highest sequence number among the overwritten writes that an identified data block is found with that sequence number; failing the test conditional on the checking failing to establish the all such data blocks are found.

According to a still further aspect of the disclosure, there is provided a data integrity component for validating operation of a storage medium in production use in which data blocks are written by write processes to the storage medium, the storage medium being subdivided into a number of address blocks available for data storage, the data integrity component comprising: a write data generator for generating in sequence a sequence number for each data block as it is generated, the sequence number indicating the data block's position in a stream of data blocks and write status information specifying the sequence number of the oldest preceding write that has not yet completed and the highest sequence number among overwritten writes at the time the data block is generated; a data writer for writing customer data to the storage medium in which data blocks are written by write processes, the data blocks comprising a customer data portion and a metadata portion which is populated with the data block's sequence number and write status information; and a data validator for assessing data integrity on the storage medium at any arbitrary point in time during the production use by: examining the storage medium to identify from the data blocks stored on the storage medium their sequence numbers; among the identified data blocks identifying the last-written data block which is the one with the highest sequence number; extracting from the last-written data block its write status information; checking in a range of data blocks defined with reference to the write status information values for the sequence number of the oldest preceding write that has not yet completed and the highest sequence number among the overwritten writes that an identified data block is found with that sequence number; failing the test conditional on the checking failing to establish the all such data blocks are found.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Turning now to FIG. 1, a block diagram of a storage system 10 is depicted according to embodiments of the invention. The principal illustrated components of the storage system 10 are a data integrity component 20, a storage medium 30, and a production data writer 40, these principal components being interconnected by suitable interfaces 25 as illustrated. In addition, the storage system 10 is also connected to the outside world, i.e., the wider network, by one or more suitable interfaces, one of which is illustrated. The storage medium 30 is a standard storage medium of any type and includes a storage controller 34 and a storage area where storage volumes 36 reside. In different embodiments, there may be one or more storage volumes 36 as desired. Each storage volume is subdivided into a number of address blocks available for data storage. The production data writer 40 has the role of writing customer data to the storage volumes 36 in normal production use. The term customer data is used to mean any data which a regular user of the storage medium wishes to store, and is used as a counterpoint to other data which can be written to the storage medium as part of the test procedures described herein which form subject matter of certain embodiments of the invention.

The data integrity component 20 comprises a test data writer 22 responsible for exercising the storage volumes 36 with test data and a data validator 28 which reads back the test data to check if the writes of test data have taken place correctly.

The test data writer 22 comprises a write location generator 23, a write data generator 24, a data writer 26 and an exercise controller 27. The write data generator 24 is operable to generate a stream of data blocks in sequence to write to the storage medium, each data block being allocated a sequence number indicating its position in the stream, the sequence number being stored with the data block together with write status information specifying the sequence numbers of those preceding data blocks in the stream which are still being written to the storage medium at the time the data block is generated. The write location generator 23 is operable to allocate the address block to which the next data block in the stream shall be written by applying a sequencing function to the sequence number. The sequencing function is periodic. The data writer 26 is operable to perform a write process for each data block to its allocated address block. The exercise controller 27 is operable to exercise the storage medium by generating a stream of data blocks, and to perform a write process to the allocated address block for each data block.

The data validator 28 is operable to assess data integrity on the storage medium of data written on the storage medium. The data validator 28 can perform this assessment at any arbitrary point in time, and in particular when one or more write processes are unfinished. The assessment can be made on the storage volume data directly, e.g., by pausing any unfinished writes, or by taking a PiT copy of the storage volume and assessing the data on the PiT copy.

The validation process proceeds by examining the storage medium to identify from the data blocks stored thereon their sequence numbers. Among the identified data blocks, the validation process identifies the last-written data block by means of its sequence number, since this block will be the one with the highest sequence number. The write status information is then extracted from the last-written data block. It is then checked that the sequence numbers of the identified data blocks are a match to those that should be present on the storage medium based on the sequence numbers stored in the write status information of the last-written data block.

If there is not a match between all these pairs of sequence numbers, then this is taken to mean that there has been a problem, since what is on the storage volume does not correspond to what should be there according to the write status information in the last-written block.

The validation process may then continue by carrying out a similar pairwise comparison based on the penultimate-written block, antepenultimate written block and so forth as follows. In turn, for each other data block, extracting its write status information; checking that the sequence numbers of the identified data blocks are a match to those that should be present on the storage medium based on the sequence numbers stored in the write status information of said other data block; and failing the test conditional on the checking failing to establish the match (e.g., a test fails by failing to establish the match).

Another check that can form part of the validation process, and will in practice probably be carried out before the tests just described is to check that the data blocks that have been read back occupy the correct address blocks. This can be done for each of the data blocks by checking that its sequence number, when applied to the sequencing function, results in an address block that matches the address block where the data block is actually located.

One particular way of implementing the test is for the write status information to be in the form of a bitmap encoding a range of sequence numbers counted back from the sequence number of the block in which it is encoded, wherein the bitmap has one bit for each sequence number in the range, each bit either being set or unset depending on whether the block with which it is associated had its write process complete or not at the time of writing the data block in which the bitmap is stored. The present invention may refer to this bitmap as a write status bitmap. The write status bitmap has a bit for each sequence number between the current sequence number and the lowest sequence number among the write processes that are not yet complete. The write status bitmap is then used in the validation process as follows. The data validator 28 constructs its own bitmap from the read-back data blocks, which the present invention may call a validation bitmap, and compares the validation bitmap with the write status bitmaps it recovers from the test data. The validation bitmap has bits corresponding to the bits of the write status bitmap, wherein each bit of the validation bitmap is set or unset depending on whether a data block with that sequence number is found on the storage volume. The data integrity checking is then performed by a bit-by-bit comparison of the write status bitmap and the validation bitmap.

An additional test that may be performed as part of the validation process is to further extend the checking to check that data blocks are found in the examining of the storage medium for sequence numbers below the lowest sequence number among the write processes that are not yet completely stored in the write status information. All data blocks having sequence numbers below the lowest sequence number among the write processes that are not yet complete may be checked in this way or only blocks within a particular range.

The range can be defined with reference to the periodicity of the sequencing function going back by an amount up to the sequence number one period below the sequence number of the last-written data block. (In production use, the range should additionally be limited so it does not extend to sequence numbers lower than that of the data block having the highest sequence number among the data blocks which were overwritten at the time the last-written data block was written.)

Assuming all these tests have not resulted in a fail, then the test delivers a pass result, although of course the test may include other test elements not yet described, which if failed could result in an overall fail result. The operation is described below in more detail.

The data integrity component 20, or disk exerciser, is configured to run the proposed data validation method. The data integrity component has access to a storage system undergoing test via a suitable interface, such as a SCSI (Small Computer System Interface) or other block-based storage interface. The test data writer 22 comprises the write location generator 23 which decides where data is to be written and a write data generator 24 which decides what data to write. The write location generator 23 is operable to carefully control the chosen write location so that older data is only overwritten intentionally, which it does by writing data according to a pattern which is configurable. (Here it should be noted that it is implicit in the proposed method that the disk or other storage medium to which the method is applied be physically of the type which has locations that can be written to, and re-written to, repeatedly, such as a magnetic storage medium.) The write data generator 24 is operable to ensure that the data written describes which writes have already been completed so that this information can then later be transmitted back to the data validator 28.

In a real application, i.e., production use (as opposed to a test application, i.e., test or exerciser use), a stream of writes will have some interdependencies. For example, a write signifying that a database transaction is complete will have a dependency on all the writes that are part of that transaction. A storage system must not allow a write to be processed in such a way that it is assumed to have been completed, if not all writes it depends upon have already completed. Otherwise, continuing this example, if the database application was restarted with the completion write applied, but the earlier writes not yet applied, the transaction journal would incorrectly indicate that the transaction is fully complete.

The SCSI protocol requires that, if any write completes successfully, this successful completion may be relied on by later writes. Therefore, the application in our example must wait for all the writes within a transaction to complete successfully, and only then can it submit the write signifying that the transaction is complete to the storage system. The present invention may refer to the indication of completion in the following as a completion flag. The completion flag may have any data structure. In this way, the application will know that the only states the storage system can be in at a particular point in time are: None of the transaction writes, some combination of the transaction writes but no transaction completion write, and/or all of the transaction writes and the transaction completion write.

The greatest amount of interdependency is when each write submitted depends on every previously-completed write submitted from an application. In practice, applications have significantly less interdependency in their sequences of writes, but if our artificially-generated write pattern has this maximum level of interdependency, then the subtlest incorrect behavior can be detected.

Within the data for a given write, the write data generator encodes the set of other writes that the write depends upon. This will be all the writes that have already completed in order to give the greatest amount of interdependency as described above. These writes will not truly depend on each other, but the data generated for a write allows the method of the present invention to simulate the greatest possible amount of interdependency. This data will be used by the data validator 28 to understand what data also needs to be present on the volume (or volumes) for this specific write to be correct. If insufficient data is there, the point-in-time copy process has not copied the correct set of data, i.e., the data is errored as determined by its lack of self-consistency. Thus, the write generator generates data that describes the set of writes that have already completed, and so are within the maximal set of writes that the write being generated could depend upon.

In the data writer, the number of write operations that the disk exerciser permits to run simultaneously is configurable and may be limited to a particular value in order to mimic a particular real application, as desired.

The disk exerciser generates an artificial stream of writes. Each write has a number, with writes being allocated numbers sequentially. At any one time there are potentially many writes outstanding during the test, much like a real host application might have. Writes can be generated and applied in parallel. Generally, the disk exerciser will not require one write to complete before starting the next one. Moreover, since applying a write typically takes significantly longer than generating one, it is possible to end up with many writes outstanding at once, perhaps hundreds or even thousands.

The proposed disk exerciser allows the implementer, or user, to decide the maximum number of writes that the process is permitted to have outstanding at any one time. Choosing different values for the maximum permitted number will result in testing, i.e., exercising, the storage system in different ways. For example, the user may wish to simulate a completely serialized workload with only one outstanding write being allowed at any one time. Alternatively, the user may wish to simulate a highly-parallelized database workload, with many hundreds of writes being applied simultaneously.

In the following, the present invention may denote the maximum permitted number of outstanding writes as M.

It is also noted that, although many writes may be applied simultaneously, there is a distinct order to the writes: the write location generator will be called sequentially for each write as it starts, as will the write data generator. However, the disk exerciser will not wait for write x to complete (i.e., to be applied to the storage) before using the write location generator and write data generator for write x+1. Rather, the disk exerciser only waits before performing a given new write x+1, if the current number of outstanding writes is equal to (or greater than) the maximum permitted number M.

A contrived example sequence where M is 2 (and one of the writes is slow) may be as follows:
Start write 1
a. Use write location generator for write 1
b. Use write data generator for write 1
c. Apply write 1
Start write 2
a. Use write location generator for write 2
b. Use write data generator for write 2
c. Apply write 2
Write 1 finishes
Start write 3
a. Use write location generator for write 3
b. Use write data generator for write 3
c. Apply write 3
Write 3 finishes
Start write 4
a. Use write location generator for write 4
b. Use write data generator for write 4
c. Apply write 4
Write 2 finishes.

The above steps could be constructed with the following pseudocode:

```
do(forever)
{
    atomically get and increment shared sequence number, w
    call write location generator for w
    call write data generator for w, generated location
    write data to location
}
``` with this sequence happening in parallel M times, and with each instance of this sequence tracking the write processing using a particular resource.

Test Data Writer

The data writer is used to write data to one volume. The data on that volume is instantaneously captured while the data writer is writing data, using some mechanism such as:
  triggering a point-in-time copy to be captured such as a FlashCopy
  a continuous replication mechanism such as Global Mirror where the replication is interrupted
  a mirrored volume environment where the two mirrors are split.

As a result of this data capture, a copy of the volume exists that is frozen with respect to further host writes. To be error free, the data in the copy must be self-consistent in that, for any write present in this copy, all the writes depended on by that write should also exist in that copy.

The data validator described further below is used on the PiT copy to validate that the frozen data on it is self-consistent. This is important to validate, as this aspect of data being frozen in a self-consistent state is integral to the functionality of these three mechanisms. In particular, point-in-time copy solutions and continuous replication solutions would have no value if the data were not captured correctly.

1. Test Data Writer: Write Location Generator

The write location generator applies a function $f$ (algorithm) to generate a sequence of write locations where the test data is to be written.

The function $f$ is applied successively by incrementing a write index or sequence number 'w' so that the write location is $f(w)$. The function is chosen to ensure sufficiently large separation between writes to an individual location on the storage volume. By a large separation, the present invention may mean that the value of $f(w)$ is unique over as wide a contiguous range of values of w as needed, so that identical values of $f(w)$ are generated for values of w that are sufficiently highly separated. This separation is generally termed as the periodicity of the function. The large periodicity allows the data validator to distinguish in a PiT copy between a first case in which data is not present because the storage system did not apply it, and a second case in which the storage location has merely been overwritten as part of the write location generation as a consequence of the cyclical nature of the function $f$.

For example, on a volume with 100 LBAs, consider $$f(w)=(w*10) \text{MOD } 100$$

i.e., multiply the sequence number by ten, then use the remainder of dividing that value by 100. In this case, $f(w)$ would return 0 for w=0, 10, 20, 30 . . . and thus the same write locations would be generated ten writes apart.

Now consider $$f(w)=(w*11) \text{MOD } 100$$

Now $f(w)$ will return 0 for w=0, 100, 200, . . . and so the same write locations are generated 100 writes apart.

The first of these two functions means that only the last ten writes generated by the write generator will exist on the disk at any one time, while the second means that the last one hundred writes will exist on the disk at any one time.

Let us now consider a write with sequence number 20, where the write data generator will provide data that the write depends on write 4 (i.e., write 4 had completed before the write data generator executed for write 20). The volume is captured using a PiT copy operation soon after write 20 is applied to the storage, and then the data validator is used to check whether the resultant data is correct.

When the data validator examines write 20, and sees that it depends on write 4, write 20 should only exist in the copy if write 4 exists in the copy. But if the data validator reads the data at the location write 4 would have been applied to, and discovers from the data that it is not write 4, there are two distinct possibilities. First, the point-in-time copy system has not correctly captured write 4, or the storage system did not correctly apply it. This means that the storage system has behaved incorrectly and the copy is corrupt. Second, the system is behaving correctly, but write 4 has been overwritten by the time the point-in-time copy captured the data by a later write in the generated stream of writes.

For example, the first of the two functions above would result in write 14 overwriting write 4. The data validator would not be able to distinguish between these two possibilities once write 14 was submitted, since the overwriting would prevent it from detecting if write 4 had been correctly applied. On the other hand, if the second of the two functions above were used, write 4 would not be overwritten until write 104, meaning that there is a much greater period during which a failure to include write 4 in a point-in-time copy can be distinguished from the write being overwritten.

It is therefore important to know the periodicity of the function $f(w)$ that is being used, noting that linear-feedback shift registers (LFSRs) and sequential write generators with large periodicities are known and available.

For the function, the present invention may envisage some embodiments that use a simple function in which the write location is incremented sequentially to simulate a sequential write workload, and other embodiments which use a function that is based on pseudo-random generation of the write location to simulate a random write workload with a degree of parallelism defined by the maximum permitted number of outstanding writes as M.

In a sequential write, the storage location is simply incremented with the sequence number, so that, for example, data is written to logical block addresses (LBAs) in order, e.g., LBA 1, LBA 2, LBA 3, etc. This approach is simple and fast, and also represents a common real-world data sequence pattern, where 'real-world' means a data write sequence that would be carried out in normal use of the storage volume.

In a pseudo-random write, the present invention may use a LFSR as a pseudo-random number generator. (An LFSR is a shift register whose input bit is a linear function of its previous state.)

The LFSR has a period, which is the number of iterations over which unique numbers with pseudo-random values are output, before the output repeats. The period equals $2^n-1$ where 'n' is the number of bits in the LFSR. The period is chosen to be equal to or greater than the number of LBAs in the volume to be tested, so that addresses over the whole volume can be written to in pseudo-random order during a test. The period is also preferably chosen to be less than double the number of addresses (e.g. LBAs) in the volume. Any write locations that are generated by the LFSR which have an address (LBA) greater than the size of the volume are discarded. A pseudo-random access of a volume represents another important real-world data sequence pattern.

In both the sequential and pseudo-random write, the separation of writes is maximized, in that every possible address (LBA) will have been written to once before the first written-to address is overwritten. Maximizing the separation in turn maximizes the ability of the testing to identify dropped I/O.

In systems where data consistency is provided across multiple volumes, the write location generator can consider the addresses (LBAs) of the multiple volumes as one contiguous address space, thereby allowing write consistency to be tracked across all of them.

The write address generating function $f(w)$ should be chosen such that it exhibits a periodicity, P, such that an address (e.g. LBA) will not to be overwritten for at least P writes to the volume. As known to the skilled person, there is a variety of such functions which could be used.

2. Data Writer: Write Data Generator

The write data generator has the role of generating the test data which is to be written to the data store (disk) to the address decided upon by the write location generator.

The test data may include any one or more of the following information types. These types are similar to those known for existing disk exerciser tools that write meaningful data:

Time of writing
Address being written to
Volume(s) covered by the test writes
Write location generating function, $f$
Sequence number, w
Sequence number of the oldest preceding write that has not yet completed, m
Bitmap of writes
Expanding on each of these categories.

Time of writing: The time that the write is submitted to the storage system, e.g., in UNIX time and/or in real time, e.g., with a microsecond counter.

Address being written to: LBA and/or SCSI logical unit number (LUN) or other volume identifier that the write is to be sent to.

Volume range covered by test: The set of volumes in order they will be written to in the course of the test. If data conveying this information is written as part of the test, then the written data will be sufficiently self-describing that the data validator can identify the details of the test from the data. The data will in this case, for example, specify which volumes data was, or was to be, written to, and the order in which the test writes are logically concatenated, so that the write location generator can write across all the volumes. These are significant aspects of what the data validator should check to establish data validity.

Write location generating function, $f$: As described further above when describing the write location generator.

Sequence number, w: As described further above when describing the write location generator.

Sequence number of the oldest write that has not yet completed, m: The write encodes the value m which indicates, at the time of writing, what was the oldest uncompleted write. For example, if the present invention considers the generation of data for write 100200, where all of writes 1 . . . 100000 have completed, and write 100001 has not completed. Writes 100002 . . . 100199 may or may not have completed. The present invention may not need to encode any of writes 1 . . . 100000 in a bitmap, but only need to record the integer 100001 as the most recent write number (sequence number), from which it is recorded in write 100200 that at the time of writing all writes 1 . . . 100000 were complete. The present invention may record this value as m in the write data. By the time the present invention may generate data for the next write, write 100201, write 100001 may have completed, in which case the value of m for write 100201 would be incremented to specify the oldest non-completed write, i.e., m would be greater than 100001. The parameter m is thus a demarcation between those writes which have all completed (writes with sequence number w<m), and those writes up to the current write (writes with sequence number w=m to w) at least one of which has not completed.

Bitmap of writes: The bitmap is of the writes with sequence number m to the current sequence number, i.e., between m and w, and thus forms a record of the completion status of these writes. In the previous example, where present invention may generate write data for write 100200, and m was 100001, the bitmap for write 100200 will encode the completion status of writes 100001 to 100199 (or 100200). Thus, if the second bit in this bitmap were set, this would indicate that write 100002 had completed at the time that write 100200 was generated. In this example, the bitmap size, b, would be at least 199 (or 200) bits. If the size of the bitmap is preconfigured it will be set to have a number of bits, b, somewhat greater than the maximum permitted number of outstanding writes M, since if there are 100 uncompleted writes, some of these are likely to be older than w-M, e.g., say 82 of the uncompleted writes are in the last 100 writes, but a further 18 are older. (If the bounding value were M, or too close to M, then the write generation process would be frequently stalled and cause performance of the disk exerciser to drop badly.) The bitmap size, b, should therefore be pre-configured to be perhaps one-and-a-half times or twice M and will also take account of the magnitude of M. Moreover, to avoid the oldest incomplete write, m, not being encoded in the bitmap, the disk exerciser can be configured to wait before writing the next write, until w-m<b, i.e., w-m should be statically limited to not exceed b. Taking the example of a 512 byte LBA, the approximately 480 bytes left for a bitmap allow for w-m to be over 3000, which will cater adequately even for very slow individual writes, so that any stalls will be infrequent.

The test data writer owns a set of resources for writing the test pattern to the storage system. Each resource supports writing to a single address location (LBA) at a time.

Multiple data writer instances, of M in number, execute in parallel. Each data writer instance or resource proceeds as follows with its writing actions until P writes have been generated across all instances:

atomically increment sequence number s, shared across all M instances, and record this new value of s as sequence number w, local to this specific instance request write location based on sequence number w from write location generator request data for $w^{th}$ write from write data generator submit write to storage system at chosen location and with chosen data wait for write to complete update bitmap of outstanding writes and most recent write sequence number m before which all writes have completed Once P writes have been generated across all instances, the process should seek permission before continuing with further writes.

It is important to note that each sequence number, w, is only used once across all instances, i.e., each sequence number is unique to a particular write for the whole exerciser. Knowledge of the most-recently allocated sequence number therefore needs to be shared across all instances that are running in parallel as sequence number s. For a particular instance in a multiple instance system, the set of w will have non-unitary increments.

The bitmap update of outstanding writes is also shared across all instances, by sharing the parameter m, i.e., the index of the oldest non-completed write across all instances. The bitmap shows which of the writes issued between m and s are complete and incomplete.

Since, the parameters m and s as well as the bitmap are shared between all instances, modifications to them would need to be made in an appropriate way. For example, changes could be made by one instance with spinlocks or mutexes preventing other instances from updating these values. Such techniques are well-known in parallel processing technology.

Each write can be modified to pace the writes and react to their completion in a single-threaded manner. The process logically runs with M threads in parallel, each choosing the next available sequence number, then generating and applying the write for that sequence number. There are thus at most M writes that are being applied simultaneously. Since applying the write (from the submit to complete step) typically takes much longer than the other parts of the process, there will usually be close to M writes being applied simultaneously. This activity can be implemented by creating separate threads or in a single thread with this being a design choice for a person skilled in the art.

For example, the following two approaches are equivalent:

in parallel
    until P writes have been generated
        atomically increment w
        generate and submit write w wait for write w to complete
and
    until P writes have been generated
        wait for there to be fewer than M writes outstanding
        atomically increment w
        generate and submit write w Since there are M write generators, and since the previous iteration of any given write generator waits for its write to complete before generating the next write, this iteration can always perform a new write without too many writes coming into existence at any one time.

The number of writes outstanding at any one time may be chosen to match a desired queue depth or write rate so that the storage system can be loaded by a desired amount. The number of writes may also be limited such that the range of writes encompassing all non-completed writes w−m (or s−m following our modified notation) is sufficiently small that a bitmap of all outstanding writes may be stored in each address (e.g. LBA) (e.g., each address being written to). Here it should be noted that the number of outstanding writes is the number of writes that can be done in parallel, not the number that haven't been started. In other words, "outstanding" is taken to mean started but not yet complete, rather than not yet complete (and possibly not even started).

Now consider a specific example further by way of explanation of this part of the process. The number of bits in the bitmap may be taken as, b=200, as before and the number of write processes running in parallel, M=5. By definition every write in the range w−m has been submitted to the storage system. The bitmap will contain a 1 (TRUE) for a write that has completed back from the storage system, and 0 (FALSE) for a write that has not yet completed back from the storage system. Again, consider the point in time at which the disk exerciser is preparing data for write 100200, all writes from 1 . . . 100000 having previously completed and write 100001 having not yet completed. The sequence number w is 100200 and m is 100001, so w−m is 199, which means that there is a set of 199 writes at this point that have been submitted and may or may not have completed yet. The bitmap will be used to encode exactly which of these has completed at this point. Since M is 5 and b is 200, let us assume that the maximum five writes have not yet completed, and these writes have sequence numbers 100001, 100090, 100197, 100198, and 100199. The bitmap has 200 bits in it, each of which signifies whether an individual write has completed.

The first bit in the bitmap represents write w−b, or 100000, and the last bit in the bitmap represents write w−1, or 100199. Accordingly, all the bits in the bitmap are set apart from bits 1, 90, 197, 198, and 199, assuming a zero-based indexing system.

Data Validator

The data validator is a data reader with the role of reading back and validating the data on a volume, and may be referred to as the "data validator" in the following. The data validator can act to check the current state of a volume by interrupting a data write, i.e., temporarily pausing it. Alternatively, the data validator can act to check a PiT copy of a volume, when an image of the volume has been taken and stored 'on the fly' while the test data writer was writing a pattern.

The data validator inspects a PiT copy of the volume after, or during, test writes have been made to the volume, so that the data on every LBA of the volume being checked by the data validator will have been written by the write data generator and hence contain all those fields described above, including the sequence number used by the write location generator to choose that LBA, and details of all writes that were outstanding when that LBA was written.

Once a sequence number has been identified within the LBA that has been read, it is possible to use the same algorithm that the write location generator used to check that the data was written to the correct LBA for that sequence number. The other fields, such as the algorithm used, the time of the write, and the value of m, can all be checked for validity. It might not be possible to know what the correct value should be in all cases, but many of these fields will only be valid in certain ranges, for example the time that one LBA was written is likely to be in a range of time (e.g. within only a few hours at most) from the time that the other LBAs were written.

The data validator can use a bitmap with P bits to track the sequence numbers of data that is present in the PiT copy of the volume. For a large value of periodicity P, the bitmap may need to be stored on a mass storage medium such as a disk, as it could be too large to maintain in local memory.

The testing can be carried out in two main phases, Phase 1 and Phase 2.

Phase 1

For each LBA in the volume (or volumes if multiple volumes are used):
    read the LBA into a buffer
    identify the sequence number that was written into the LBA by the test data writer, and record this as sL
    validate that it is at the correct location for its sequence number sL and the write location algorithm specified in the LBA, and that all the other fields are correct
    if the data appears to have not been written in the currently performed test of the disk exerciser (e.g., relates to writes performed during a previous test—for example the disk exerciser may have a field to indicate a unique test number so that previous test writes can be ignored), or is invalid (e.g., zero data indicating no writes have ever been made to the LBA after formatting), then skip to the next LBA
    set the bit in the bitmap corresponding to the LBA's sequence number sL.

At the end of Phase 1, the validator has checked that each LBA has data that makes sense for it. It may discover the greatest sequence number by finding the rightmost (highest) position in the bitmap with the bit set, S. sM is set to the highest set bit in the bitmap, which is the maximal value of sL found in this phase, i.e., the sequence number of the LBA with the highest sequence number that is present on the volume. The present invention may refer to this highest sequence number as sM, and use it in Phase 2, where the present invention may check that the LBAs are mutually consistent.

Phase 1 has now stored in the bitmap exactly which writes are on the disk. Each write on the disk contains information about what other writes must be on the disk. Phase 2 will use that bitmap to check that all the writes are there.

The validator would then read back the bitmap written to the disk as part of write 100200. In the earlier example, it was entirely set except for bits 1, 90, 197, 198, and 199.

The first bit in that bitmap that was read back from write 100200 represented write 100000, and was set to TRUE, meaning that that write had already completed when write 100200 was being submitted. That means that if the point-in-time copy undergoing test is valid, it must contain write 100000. That can be checked by looking at the bit of the bitmap created in Phase 1 corresponding to write 100000.

As long as that is correct, the validator can move on to the next bit in the bitmap read back from write 100200. This represented write 100001, and was FALSE, meaning that that write was still outstanding when write 100200 was being submitted. It cannot make any difference to the volume's consistency whether write 100001 completed before the point-in-time copy was taken, so the present invention may not be required to look at the bitmap created in Phase 1.

The validator will then go through the rest of the bitmap read back from write 100200. For any bit set in it, write 100200 should only be present in the point-in-time copy if the write represented by that bit was seen in Phase 1 and marked as TRUE in the Phase 1 bitmap.

Finally, every bit in the bitmap generated in Phase 1 (the "known write bitmap") from 0 to sM−b will not have been checked yet, but should be TRUE, as all those writes must be present. None can have been overwritten, as the write generation process stopped at P writes, i.e., before any locations were written to for a second time.

In this example, that means all bits up to 100000 should be set to TRUE.

Phase 2

In Phase 2, the validator re-reads the LBA associated with sM from the storage to determine what data it depends on, and uses the bitmap created in Phase 1 to identify whether that data is present on the volume. It may be observed that repeating the process by examining data on earlier writes would not provide any additional validation that the correct data had been captured, since the validation for sM−1 would only check a strict subset of the LBAs that the validation for sM does.

1. Read the LBA associated with the sMth sequence number write, which may be located using the write location generator. That LBA can only be valid if all writes that had completed at the time it was written are present on the storage.

2. Obtain the bitmap of completed writes within the LBA. Each of the bits set in the bitmap represents an LBA believed to have been written successfully at the time that the latest write was written. This can be compared with the equivalent section of the bitmap of known writes, generated in Phase 1 from examining which LBAs are present in the PiT copy and their contents: if any bit set in the bitmap stored in the sM$^{th}$ LBA (i.e., indicating that write was complete) is not set in the bitmap recreated from reading the whole contents of the PiT copy from sequence number sM to sM−b (i.e., indicating LBA of the supposedly completed write is in fact not present in the PiT copy), then the volume is not consistent.

3. Check that every bit in the known write bitmap is set from the first bit up to the bit before the bit corresponding to the oldest incomplete write at the time of writing the write with sequence number sM, i.e., bit 0 to bit (sM−b). If any are missing, the volume is not consistent.

By way of example, if the write with the greatest number seen in Phase 1 was write 100200, the validator would set sM to 100200.

The description of Phases 1 and 2, and also the whole description of the above worked example, is now complete. To summarize, the proposed method allows a point-in-time copy or a replication to be paused at any point during the disk exerciser's execution, and the resulting disk state can be analyzed for consistency. This allows these features to be tested much more thoroughly than the prior art.

Figure 2:
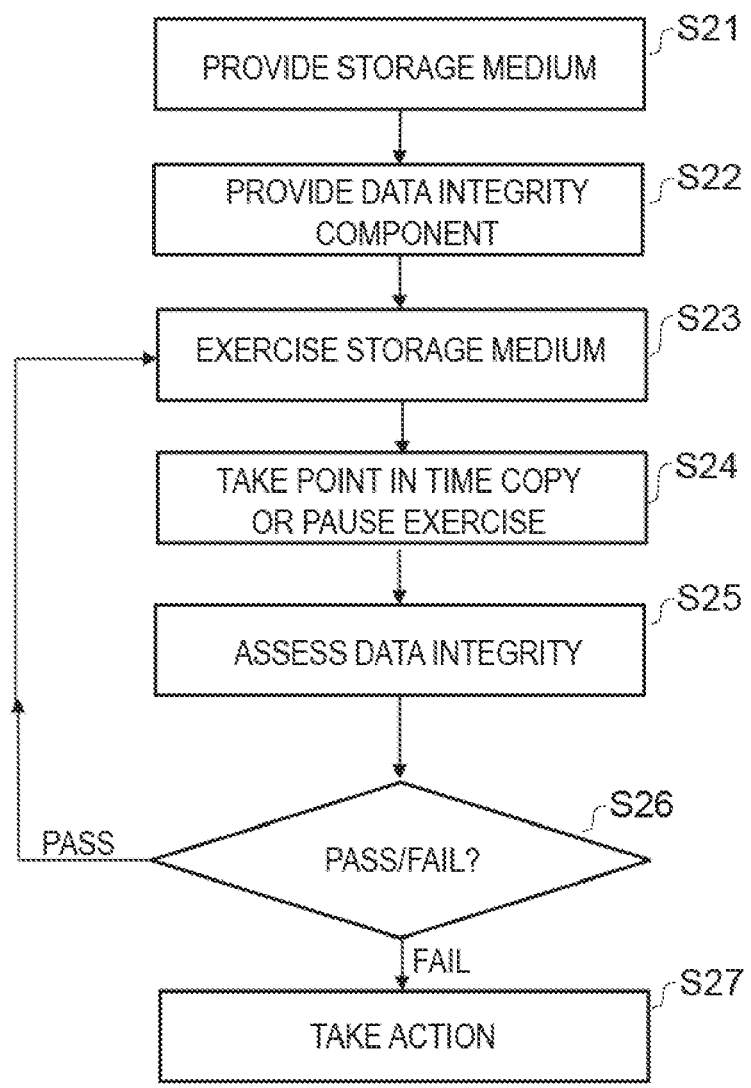
FIG. 2 is a flow diagram showing a method of exercising a storage medium to check whether it is operating correctly according to an embodiment of the invention.

FIG. 2 is a flow diagram showing the overall flow of the method just described.

In Step S21, a storage medium is provided.

In Step S22, a data integrity component is provided. The data integrity component comprises a write data generator for generating a stream of data blocks in sequence to write to the storage medium, each data block being allocated a sequence number indicating its position in the stream, the sequence number being stored with the data block together with write status information specifying the sequence numbers of those preceding data blocks in the stream which are still being written to the storage medium at the time the data block is generated. The data integrity component further comprises a write location generator for allocating the address block to which the next data block in the stream shall be written by applying a sequencing function to the sequence number, wherein the sequencing function is periodic. The data integrity component further comprises a data writer for performing a write process for each data block to its allocated address block. The data integrity component further comprises an exercise controller operable to control the write data generator, the write location generator and the data writer to exercise the storage medium by generating a stream of data blocks, and to perform a write process to the allocated address block for each data block. The data integrity component further comprises a data validator for assessing data integrity on the storage medium at any arbitrary point in time during operation of the exercise controller.

In Step S23, exercising the storage medium with the exercise controller.

In Step S24, at any arbitrary point in time during the exercising, a PiT copy of the volume is taken from the storage medium to assess for data integrity, or the storage system is frozen, i.e., paused, so that the volume can be checked in situ.

In Step S25, the data validator is used to assess data integrity of the PiT copy or frozen volume. This is done by: examining the storage medium to identify from the data blocks stored on the storage medium their sequence numbers; among the identified data blocks identifying the last-written data block which is the one with the highest sequence number; extracting from the last-written data block its write status information; and checking that the sequence numbers of the identified data blocks are a match to those that should be present on the storage medium based on the sequence numbers stored in the write status information of the last-written data block.

In Step S26, a pass or fail result is determined based on whether there has been a match between all sequence number pairs.

If there is a pass, then exercising continues by the flow passing back to Step S23. If there is a fail, the exercising is stopped and appropriate action is taken at Step S27.

If a fail result is determined, the PiT copy has not correctly captured point-in-time data. The data from the most recent b writes, writes (sM−b) to sM, could be captured. The vendor of the PiT technology can use the self-describing data in these LBAs to analyze why the PiT technology failed to capture data correctly.

A number of extensions and variations are now discussed that could be individually applied or jointly applied in any technically feasible permutation to the proposed method.

The method as described above assumed that there would be a single run through the volume and that during this single run however many copies that are desired are taken for later analysis (e.g., snapshots or replication freezes). Instead of taking PiT copies, the write process could be paused and the method performed on the data actually recorded on the storage volume.

Instead of performing a single run, the method can alternatively also be performed by repeatedly running through the volume, i.e., writing data blocks over more than a single period of the sequencing function. As in the single-run method, a PiT copy of the data can be taken at any point, or the writing be paused at any point. With this variant, the data writing process is modified to not stop after P writes, but to continue as long as desired and potentially indefinitely. The sequence number would then increment for as long as this continuous writing and over-writing state persisted, and need not be restarted.

The data validator should be extended to include an additional phase to be carried out first before the above-described Phase 1 and Phase 2. This new Phase 0 involves iterating through all LBAs and recording the maximum sequence number in use on the volume which may be denoted as "sM."

If sM is less than P, Phase 1 and 2 can be used as described above without modification to check the volume, since it is known that no overwrites have taken place.

On the other hand, if sM exceeds P, the system can use Phase 1 above to identify which writes are in use, but the bitmap is shifted so that the right-most bit is for sM, and the leftmost for sM–P. If any writes are encountered from before sM–P, they can be ignored.

Finally, Phase 2 is used to check that all needed writes are present. The test in step 3 of Phase 2 (that all bits in the bitmap before sM–M are set) should be modified to check bits 0 . . . P–M.

Another variation uses different size writes. The above description has focused on examples in which each write corresponds to one LBA. However, it would be a routine modification of the above-described method to change the size of the writes, e.g., to cover multiple LBAs per write, or a fragment of an LBA. The proposed method can operate without change from the method described above for fixed-size writes of any size.

Another variation of the proposed method is to adapt it to cater for variable-size writes, for example, where writes of different sizes are applied to a volume or set of volumes simultaneously as part of the same test. To cater for this, a data generator and validator could be used as described in the "Production use" section below.

A further variation which would speed up the method would be to reserve LBA 0 (or some other well-defined LBA) of the volume to store metadata about the whole process. The write location generator would then be modified to skip LBA 0 from the test writing process. If the system writes the latest sequence number to LBA 0 every M writes, this can be used to skip phase 0 of the validator, by providing an approximation of sM.

A still further variation allows for identifying unwritten data. If the data generator stores a value in the written metadata that is unique to a particular execution of the process, it will be possible for the validator to distinguish between unwritten LBAs that contain invalid data, and LBAs written in this execution that have been placed incorrectly. This would allow several varieties of storage system error to be identified.

Production Use

The above-described method of exercising a storage medium can also be extended to continue in modified form during production use in order to validate that writes to the storage medium are operating correctly. Alternatively, what the present invention may describe could be a stand-alone method for validation during production use that is not preceded by exercising the storage medium as described above. In the stand-alone implementation, the exercise controller 27 would not be needed.

As an initial comment, the level of validation that is possible in production use will generally be expected to be not be as good as in test use, since the validation needs to fit around normal writes of production data. For example, in a test environment, the disk exerciser uses a periodic sequencing function to maximize the time interval between overwrites to the value P, whereas in a production environment, control of the writes is dictated by the production data writer 40 and the workload may continuously overwrite any data in a random (as opposed to pseudo-random) way.

To implement the proposed method in production use, the storage system will need to store extra data—metadata—alongside customer data. The simplest way to do this is to allocate a portion of each block to metadata, each block therefore having a metadata portion and a production data portion. The metadata portion contains the sequence numbers and write status information as described above in relation to the exerciser process, but bearing in mind that the write status information may need to be modified to reduce its size so that it fits into the size designated for the metadata portion. Referring to FIG. 1, the data writer 26 would then have the role in production use of writing the metadata into the metadata portion of each block. To accommodate the metadata portion, it may be easiest to use longer disk blocks than normal, so that the amount of production data that can be stored per data block remains the same as conventionally.

For example, a block size may be provided of 528 (or 4224) bytes with 16 (or 240) bytes to store the metadata alongside the production data. In the following, the present invention may refer to 16 byte and 240 byte examples as indicative of how to handle two different situations, one where the space for metadata is too small to store a bitmap of recent writes, and the other where there is enough space to store such a bitmap. In any case, it is desired that the metadata and the production data are read and maintained together, but that the metadata is stripped out for real-world host reads of the production data. The production use extension can be used for a single volume or a set of volumes that are being copied or frozen (i.e., paused) together. For the production use extension, variable-sized writes can be handled by treating each LBA as an independent write with its own sequence number and other metadata. Generally, the handling of sequence numbers in production use embodiments can be the same as in exerciser use embodiments.

The storage system will keep a record of the last R writes, where R is at least M. Here, M is the maximum number of writes which can simultaneously be written to the set of volumes being checked, and will depend on the number of hosts accessing those volumes, the type of host operating system, and the host application being used. It will also have a sequence number generator, which can assign a unique sequence number, w, to each outstanding write, and track which writes are outstanding.

If 240 bytes per LBA are allocated for storing metadata, it should be possible to store the bitmap (provided that R is less than about 1600), as well as all the other values described earlier for the exerciser embodiments. The value of m does not need to be stored. If this write overwrites any of the writes in the last R writes, the sequence number of the overwritten write is stored in this metadata. As LBAs are indivisible and sequence numbers are assigned on a per-LBA basis, a write will either not overwrite any of the last R writes or will overwrite exactly one of the last R writes. This measure permits the data validator to modify the bitmap in the validation process described below and thereby handles a situation in which a write may have overwritten data depended on by a write with a lower sequence number.

If 16 bytes per LBA are allocated for storing metadata, and with any significant value of R, there will be insufficient space for the write generator to store the bitmap of recently completed writes, or indeed much of the other data discussed in relation to the exerciser embodiments. The present invention may advocate using the limited space to store at least the following parameters from the exerciser embodiments: the sequence number, w, and the sequence number of the oldest preceding write that has not yet completed, m. In addition, instead of storing the bitmap, the present invention may advocate storing a new parameter, namely the highest sequence number among the overwritten writes, n.

To validate the volume, a similar process to that described above for continuous writing is used:

1. Each LBA's metadata is read in turn. The highest sequence number from valid metadata is recorded as sM.

2. For the 240-byte metadata process, i.e., the case when there is enough space to store a bitmap in the metadata, a bitmap of length R is created with each bit clear. Each LBA's metadata is read in turn. If valid, and the sequence number is in the range (sM–R) . . . sM, the appropriate bit is set. If there is the sequence number of an overwritten write contained in this LBA, the bit associated with that overwritten write is additionally set in the bitmap. This step accommodates the possibility that writes may have been overwritten. The bitmap records writes that have been found, or are expected not to be found due to being overwritten, which is useful for the 240-byte metadata process, i.e., the case when there is enough space to store a bitmap in the metadata.

3. For 16-byte metadata, read the LBA associated with the highest sequence number found in the LBA, sM, and test that all the bits in the known write bitmap are set in the range equivalent to sequence numbers n+1 . . . m, over the range from one after the overwritten write with the highest sequence number to one before the oldest write that was not yet completed at the time of writing the write with the highest sequence number sM. This test corresponds to Step 4 of the non-production use test above, but truncated because of the inevitable overwriting issue in a production use environment.

4. For 240-byte metadata, each LBA's metadata is read in turn. For each, if it is valid, and the sequence number is in the range (sM–R) . . . sM then the present invention may test that all the bits in the known write bitmap are set that are equivalent to set bits in the completed write bitmap of the read LBA. This process ignores bits in the completed write bitmap of the read LBA that are equivalent to sequence numbers prior to sM–R. From 16-byte metadata, it is only possible to identify valid data based on the most recent write, i.e., the write with sM stored in its metadata, since in 16 bytes there is only enough space to store the largest contiguous range of writes that is present on the storage. It is not possible to check for writes earlier than the most recently overwritten sequence number 'n' as stored in the most recent write, as the write associated with 'n' and an unknown set of earlier writes, will not be present in the copy, having been overwritten before the point-in-time copy is taken. Consequently, there is no need to inspect all LBAs in the 16-byte metadata case.

If any bits are not found to be set, the copy is missing some writes known to be complete and not overwritten in the last R writes, and so the copy is corrupt. Although this is limited to the last R writes, it focuses on the recent writes most likely to be omitted.

Figure 3:
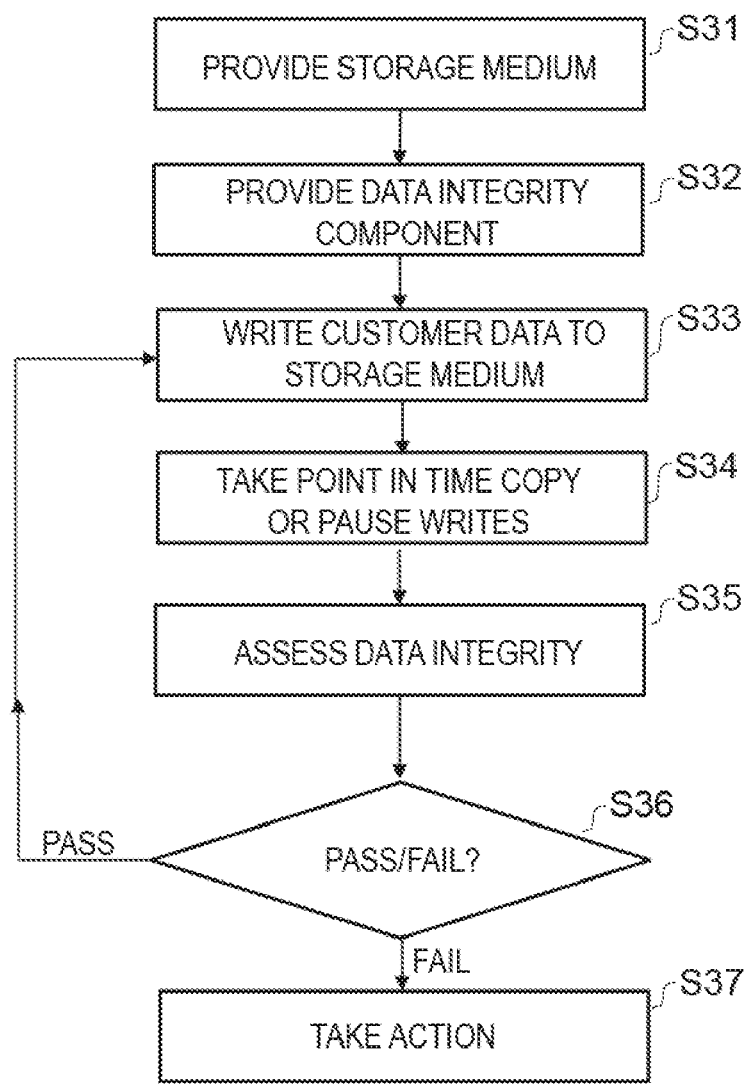
FIG. 3 is a flow diagram showing a method of using a storage medium in a production environment and checking whether it is operating correctly according to an embodiment of the invention.

FIG. 3 is a flow diagram showing the overall flow of the production use method just described.

In Step S31, a storage medium is provided.

In Step S32, a data integrity component is provided. The data integrity component comprises a write data generator for generating in sequence a sequence number for each data block as it is generated, the sequence number indicating the data block's position in a stream of data blocks and write status information specifying the sequence number of the oldest preceding write that has not yet completed and the highest sequence number among overwritten writes at the time the data block is generated. The data integrity component further comprises a data writer for inserting the sequence number and the write status information into a metadata portion of each data block as part of the write process. The data integrity component further comprises a data validator for assessing data integrity on the storage medium at any arbitrary point in time.

In Step S33, the storage medium is used in production use to write customer data with accompanying metadata for validation.

In Step S34, at any arbitrary point in time during the exercising, a PiT copy of the volume is taken from the storage medium to assess for data integrity, or the storage system is frozen, i.e., paused, so that the volume can be checked in situ.

In Step S35, the data validator is used to assess data integrity of the PiT copy or frozen volume. This is done by: using the data validator to assess data integrity, at any arbitrary point in time, to assess data integrity on the storage medium by: examining the storage medium to identify from the data blocks stored on the storage medium their sequence numbers; among the identified data blocks identifying the last-written data block which is the one with the highest sequence number; extracting from the last-written data block its write status information; and checking in a range of data blocks defined with reference to the write status information values for the sequence number of the oldest preceding write that has not yet completed and the highest sequence number among the overwritten writes that an identified data block is found with that sequence number.

In Step S36, a pass or fail result is determined based on whether all such data blocks are found.

If there is a pass, then normal production use continues by the flow passing back to Step S33. If there is a fail, appropriate action is taken at Step S37.

Following a fail result during production use, the system may perform extended validation of the data, for example with a RAID parity check, or a mirrored volume comparison. This may find and potentially fix a storage corruption that caused the PiT copy to be incorrect. An automatic repeated attempt to capture a PiT may be appropriate in some cases, though this will capture data from a different point in time which may not be desirable. Finally, it may be possible to locate missing data on other copies (including the source volume of the PiT copy) and use that data. The sequence number of the correct data will be known, and can be used to validate the correct data has been found.

It will be understood that embodiments of the present disclosure may be implemented using cloud computing. Specifically, one or more of the servers and network resources may be hosted in the cloud. For example, either the PiT copy system under test could be within a Storage-as-a-Service cloud environment, or the disk exerciser described could be run from a cloud computing environment, or both.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
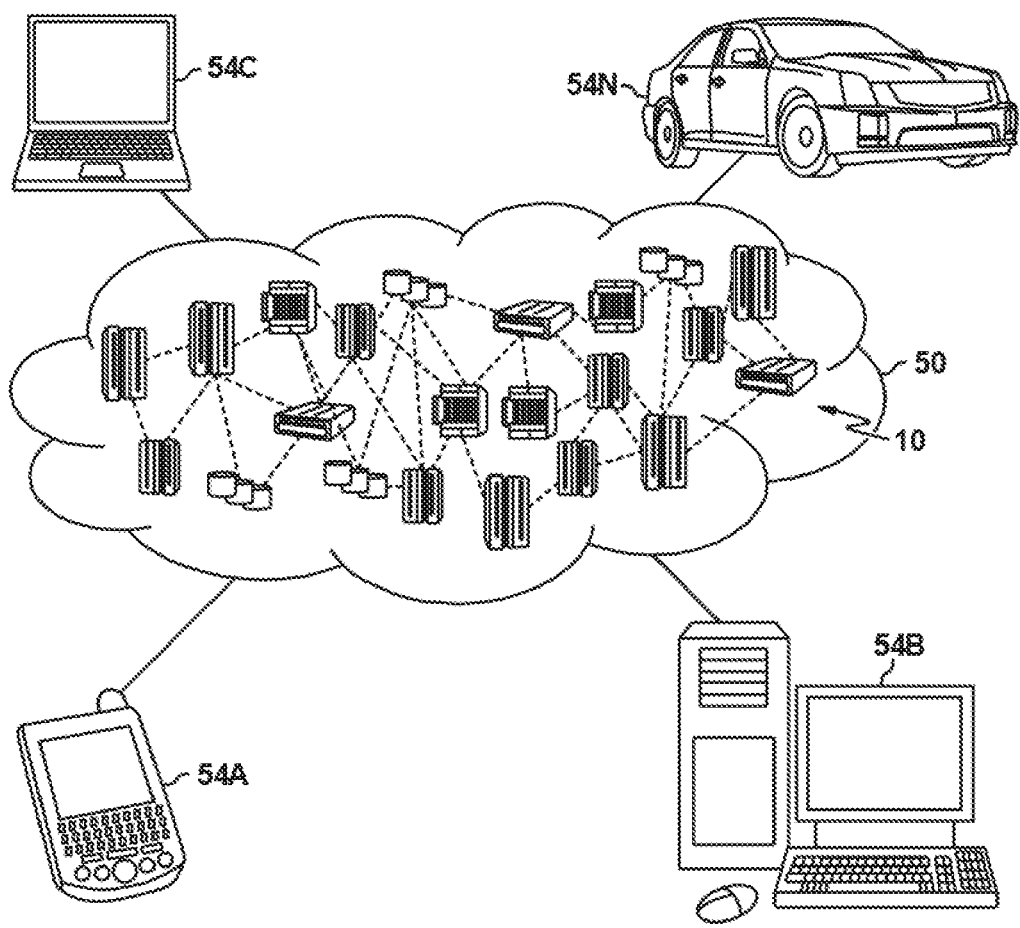
FIG. 4 depicts a cloud computing environment according to an embodiment of the present disclosure.

Referring now to FIG. 4, illustrative cloud computing environment 50 is depicted. As shown, cloud computing environment 50 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes and cloud computing environment 50 can communicate with any type of computerized device over any type of network and/or network addressable connection (e.g., using a web browser).

Figure 5:
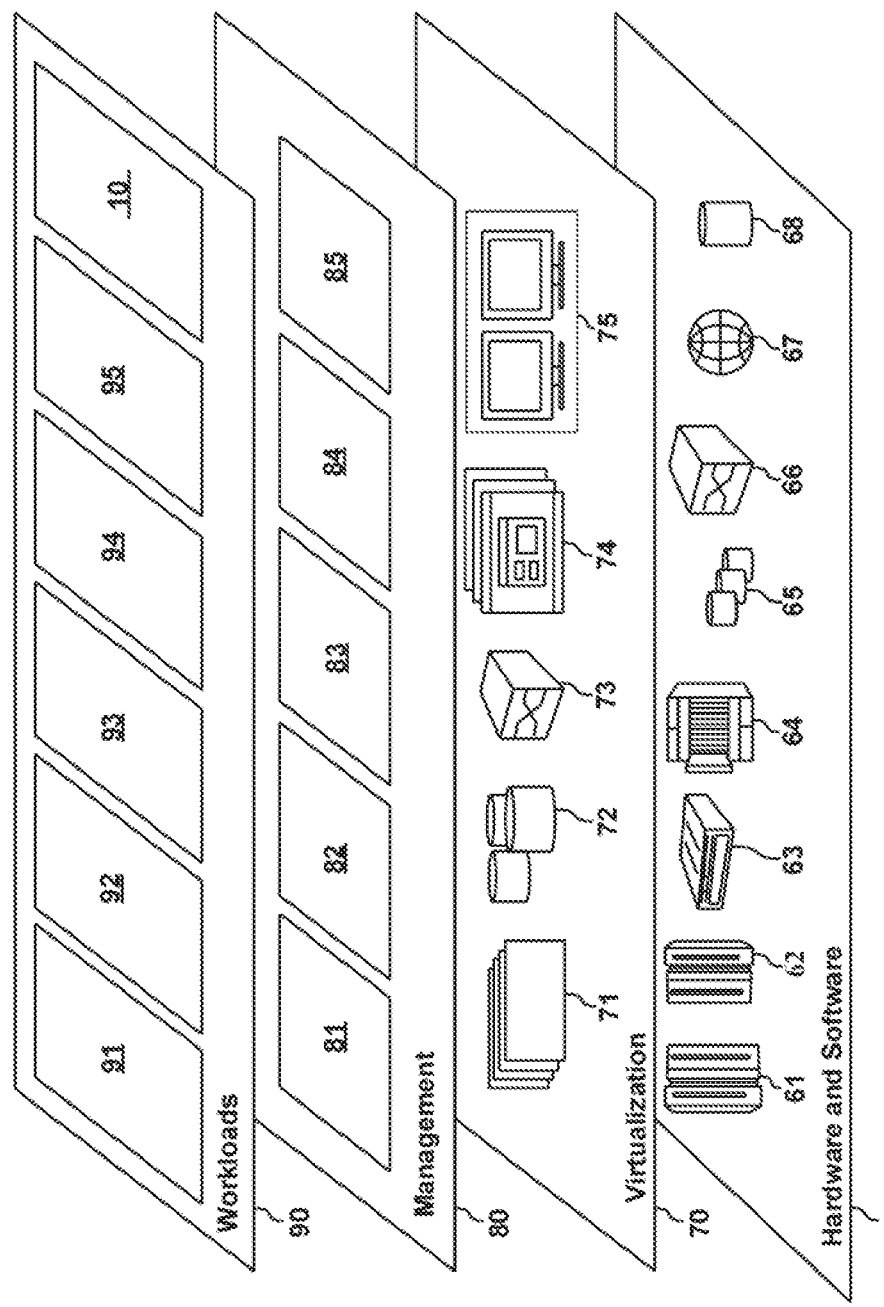
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

It will be appreciated that any of the servers or server elements shown in FIG. 1 and FIG. 2, may correspond to physical or virtualized components in layers 60 and 70 respectively.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server 10.

It will be clear to one of ordinary skill in the art that all or part of the logical process steps of the preferred embodiment may be alternatively embodied in a logic apparatus, or a plurality of logic apparatuses, comprising logic elements arranged to perform the logical process steps of the method and that such logic elements may comprise hardware components, firmware components, or a combination thereof.

It will be equally clear to one of skill in the art that all or part of the logic components of the preferred embodiment may be alternatively embodied in a logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present disclosure may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present disclosure.

In summary, the present invention may provide a method and apparatus for validating operation of a data volume on a storage medium. A data integrity component is provided which writes data blocks to the volume in a sequence, each data block storing a sequence number and also write status information specifying the sequence numbers of those preceding data blocks in the stream which are still being written to the volume at the time the data block is generated. Data validation is performed by reading back the stored data blocks from the volume and checking that the sequence numbers stored in them match those that should be present based on the sequence numbers stored in the write status information of the last-written data block found on the volume.

What is claimed is:

1. A method for validating operation of a storage medium that is subdivided into a number of address blocks available for data storage in a computing environment, the method comprising:

for assessing data integrity of the storage medium, writing a stream of data blocks in sequence to the storage medium, each data block being allocated a sequence number indicating its position in the stream, the sequence number being stored with the data block together with write status information specifying the sequence numbers of those preceding data blocks in the stream.

2. The method of claim 1, further including:

generating the stream of data blocks in sequence to write to the storage medium;

allocating the address block to which a next data block in the stream is to be written by applying a sequencing function to theسequence number, wherein the sequencing function is periodic; and performing a write process for each data block to its allocated address block.

3. The method of claim 1, wherein assessing the data integrity further includes:

examining the storage medium to identify from the data blocks stored on the storage medium their sequence numbers;

identifying a last-written data block having a highest sequence number from among the identified data blocks;

extracting from the last-written data block its write status information;

determining from the set of sequence numbers and write status information that the identified data blocks are a match with those specified in the write status information; and failing a test of the data upon failing to establish the match.

4. The method of claim 3, further including determining the match by checking that the sequence numbers of the identified data blocks correspond to those that should be present on the storage medium based on the sequence numbers stored in the write status information of the last-written data block.

5. The method of claim 3, wherein the write status information comprises a write status bitmap having a bit for each sequence number between a current sequence number and a lowest sequence number among one or more write processes that are incomplete, wherein each bit of the write status bitmap is set or unset depending on whether the write process for that sequence number is complete or incomplete, and wherein the data integrity is tested by constructing a validation bitmap having bits corresponding to the bits of the write status bitmap, wherein each bit of the validation bitmap is set or unset depending on whether a data block with that sequence number is found during the examining, and a bit-by-bit comparison of the write status bitmap and the validation bitmap.

6. The method of claim 5, further including determining the data blocks are located in the storage medium for sequence numbers below the lowest sequence number among the one or more write processes that are incomplete stored in the write status information, at least within a range.

7. The method of claim 1, further including:
permitting a maximum permitted number of write processes;
stalling a next write process upon reaching the maximum permitted number of write processes.

8. The method of claim 1, wherein copying the first data further includes:
acquiring a point-in-time copy of the storage medium; and
assessing the data integrity using the point-in-time copy.

9. A system for validating operation of a storage medium that is subdivided into a number of address blocks available for data storage in a computing environment, comprising:
one or more computers with executable instructions that when executed cause the system to:
for assessing data integrity of the storage medium, write a stream of data blocks in sequence to the storage medium, each data block being allocated a sequence number indicating its position in the stream, the sequence number being stored with the data block together with write status information specifying the sequence numbers of those preceding data blocks in the stream.

10. The system of claim 9, wherein the executable instructions further:
examine the storage medium to identify from the data blocks stored on the storage medium their sequence numbers;
identify a last-written data block having a highest sequence number from among the identified data blocks;
extract from the last-written data block its write status information;
determine from the set of sequence numbers and write status information that the identified data blocks are a match with those specified in the write status information; and
fail a test of the data upon failing to establish the match.

11. The system of claim 10, wherein the executable instructions further determine the match by checking that the sequence numbers of the identified data blocks correspond to those that should be present on the storage medium based on the sequence numbers stored in the write status information of the last-written data block.

12. The system of claim 10, wherein the write status information comprises a write status bitmap having a bit for each sequence number between a current sequence number and a lowest sequence number among one or more write processes that are incomplete, wherein each bit of the write status bitmap is set or unset depending on whether the write process for that sequence number is complete or incomplete, and wherein the data integrity is tested by constructing a validation bitmap having bits corresponding to the bits of the write status bitmap, wherein each bit of the validation bitmap is set or unset depending on whether a data block with that sequence number is found during the examining, and a bit-by-bit comparison of the write status bitmap and the validation bitmap.

13. The system of claim 12, wherein the executable instructions further determine the data blocks are located in the storage medium for sequence numbers below the lowest sequence number among the one or more write processes that are incomplete stored in the write status information, at least within a range.

14. The system of claim 9, wherein the executable instructions further:
permit a maximum permitted number of write processes;
stall a next write process upon reaching the maximum permitted number of write processes.

15. The system of claim 9, wherein the executable instructions further:
acquire a point-in-time copy of the storage medium; and
assess the data integrity using the point-in-time copy.

16. A computer program product for validating operation of a storage medium that is subdivided into a number of address blocks available for data storage by a processor, the computer program product comprising a non-transitory computer-readable storage medium having computer-readable program code portions stored therein executed by the processor, the computer-readable program code portions comprising:
an executable portion that, for assessing data integrity of the storage medium, writes a stream of data blocks in sequence to the storage medium, each data block being allocated a sequence number indicating its position in the stream, the sequence number being stored with the data block together with write status information specifying the sequence numbers of those preceding data blocks in the stream.

17. The computer program product of claim 16, further including an executable portion that:
examines the storage medium to identify from the data blocks stored on the storage medium their sequence numbers;
identifies a last-written data block having a highest sequence number from among the identified data blocks;
extracts from the last-written data block its write status information;
determines from the set of sequence numbers and write status information that the identified data blocks are a match with those specified in the write status information, wherein the match is determined by checking that the sequence numbers of the identified data blocks correspond to those that should be present on the storage medium based on the sequence numbers stored in the write status information of the last-written data block; and
fails a test of the data upon failing to establish the match.

18. The computer program product of claim 17, wherein the write status information comprises a write status bitmap having a bit for each sequence number between a current sequence number and a lowest sequence number among one or more write processes that are incomplete, wherein each bit of the write status bitmap is set or unset depending on whether the write process for that sequence number is complete or incomplete, and wherein the data integrity is tested by constructing a validation bitmap having bits corresponding to the bits of the write status bitmap, wherein each bit of the validation bitmap is set or unset depending on whether a data block with that sequence number is found during the examining, and a bit-by-bit comparison of the write status bitmap and the validation bitmap.

19. The computer program product of claim 18, further including an executable portion that determines the data blocks are located in the storage medium for sequence numbers below the lowest sequence number among the one or more write processes that are incomplete stored in the write status information, at least within a range.

20. The computer program product of claim 16, further including an executable portion that:
   permits a maximum permitted number of write processes;
   stalls a next write process upon reaching the maximum permitted number of write processes;
   acquires a point-in-time copy of the storage medium; or
   assesses the data integrity using the point-in-time copy.

* * * * *